(12) United States Patent
Tan (10) Patent No.: US 11,333,883 B2
(45) Date of Patent: May 17, 2022

(54) DISPLAY DEVICE AND CONTROL METHOD THEREFOR

(71) Applicant: SHANGHAI INTELIGHT ELECTRONIC TECHNOLOGY CO., LTD., Shanghai (CN)

(72) Inventor: Shunyi Tan, Suzhou (CN)

(73) Assignee: SHANGHAI INTELIGHT ELECTRONIC TECHNOLOGY CO., LTD., Shanghai (CN)

( * ) Notice: Subject to any disclaimer, the term of this patent is extended or adjusted under 35 U.S.C. 154(b) by 518 days.

(21) Appl. No.: 16/095,646

(22) PCT Filed: Apr. 24, 2017

(86) PCT No.: PCT/CN2017/081630
§ 371 (c)(1),
(2) Date: Oct. 22, 2018

(87) PCT Pub. No.: WO2017/186072
PCT Pub. Date: Nov. 2, 2017

(65) Prior Publication Data
US 2019/0129168 A1    May 2, 2019

(30) Foreign Application Priority Data
Apr. 28, 2016  (CN) .......................... 201610272538.7

(51) Int. Cl.
G02B 27/01   (2006.01)
G02B 26/06   (2006.01)
G02B 27/09   (2006.01)

(52) U.S. Cl.
CPC ......... *G02B 27/0101* (2013.01); *G02B 26/06* (2013.01); *G02B 27/0179* (2013.01); *G02B 27/0905* (2013.01); *G02B 27/0172* (2013.01)

(58) Field of Classification Search
CPC ................ G02B 27/0101; G02B 26/06; G02B 27/0179; G02B 27/0905; G02B 27/0172
See application file for complete search history.

(56) References Cited

U.S. PATENT DOCUMENTS

| 2014/0211146 A1* | 7/2014 | Gupta | ................ G02B 5/1861 351/158 |
| 2015/0212326 A1* | 7/2015 | Kress | ....................... G02B 3/14 349/11 |

(Continued)

OTHER PUBLICATIONS

Search Report of PCT/CN2017/081630.

(Continued)

*Primary Examiner* — George G. King
(74) *Attorney, Agent, or Firm* — Dragon Sun Law Firm, PC; Jinggao Li, Esq.

(57) ABSTRACT

The present disclosure provides a display apparatus, including: a control circuit; a display unit, configured to generate images; and a first spatial light modulator, set at a front end of the display unit and connected to the control circuit through signals, where the first spatial light modulator is configured to change a modulation pattern or content based on electronic signals generated by the control circuit, to dynamically adjust spatial imaging distances. In addition, the present disclosure further provides a method for controlling a display apparatus.

8 Claims, 7 Drawing Sheets

(56) References Cited

U.S. PATENT DOCUMENTS

| | | | |
|---|---|---|---|
| 2016/0011353 A1* | 1/2016 | Escuti | G02B 5/3083 |
| | | | 359/15 |
| 2016/0270656 A1* | 9/2016 | Samec | A61B 3/102 |
| 2017/0184848 A1* | 6/2017 | Vallius | G02B 5/3025 |
| 2018/0217377 A1* | 8/2018 | Lam | G02B 27/0179 |
| 2018/0348524 A1* | 12/2018 | Blum | H01L 51/5275 |

OTHER PUBLICATIONS

Miscellaneous documents including Address Recording Change of PCT/CN2017/081630.
Written opinion of PCT/CN2017/081630.

* cited by examiner

DISPLAY DEVICE AND CONTROL METHOD THEREFOR

CROSS-REFERENCE TO RELATED APPLICATIONS

This application is a national stage application of PCT Application No. PCT/CN2017/081630. This Application claims priority from PCT Application No. PCT/CN2017/081630, filed Apr. 24, 2017, and CN Application No. 201610272538.7, filed Apr. 28, 2016, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the invention described herein. All references cited and discussed in this specification are incorporated herein by reference in their entireties and to the same extent as if each reference was individually incorporated by reference.

TECHNICAL FIELD

The present disclosure relates to a display apparatus and a method for controlling same, in particular to a display apparatus that can dynamically adjust imaging distances and a method for controlling same.

BACKGROUND

With the development of display technologies, devices such as smart glasses have been invented. Smart glasses, also referred to as AR goggles, is a collective term of glasses that, similar to a smartphone, have an independent operating system, on which programs such as software and games provided by software service providers can be installed by users, capable of implementing, under voice or action control, functions such as schedule adding, map navigation, friends interaction, photos and videos shooting, and video calling, and can also implement wireless network access through a mobile communications network.

For a new product such as the smart glasses, a more innovative display technology needs to be developed.

SUMMARY

The present disclosure provides a novel display apparatus and a method for controlling same. The display apparatus can dynamically adjust imaging distances, so that a user feels that images respectively exist at different spatial distances during viewing, and distinctive visual experience is generated.

According to one aspect of the present disclosure, a display apparatus is provided, including:

a control circuit;

a display unit, configured to generate images; and a first spatial light modulator, set in front of the display unit and connected to the control circuit through signals, where the first spatial light modulator is configured to change modulation patterns or contents based on electronic signals generated by the control circuit, to dynamically adjust spatial imaging distances.

Preferably, the foregoing display apparatus further includes a polarizing beam splitter set in front of the first spatial light modulator, where one end of the polarizing beam splitter receives images modulated by the first spatial light modulator, and another end of the polarizing prism converts or filters ambient light into first linearly polarized light and projects the first linearly polarized light and the modulation images to a user after combining the first linearly polarized light and the modulation images; and polarization directions of the first linearly polarized light and the modulation images are perpendicular.

Preferably, the foregoing display apparatus further includes a polarizer set behind the display unit, to convert or filter ambient light into the first linearly polarized light, where the display unit and the first spatial light modulator are transparent units;

the first linearly polarized light and the modulation images are projected to a user after being combined; and polarization directions of the first linearly polarized light and modulation images are perpendicular.

Preferably, the foregoing display apparatus further includes a second spatial light modulator set behind the display unit, where the display unit and the first spatial light modulator are transparent display units; and the second spatial light modulator compensates ambient light to compensate changes generated when the ambient light passes through the first spatial light modulator and the display unit, so that light-field changes generated, after the ambient light passes through the display apparatus, in two perpendicular polarization directions are the same.

Preferably, in the foregoing display apparatus, polarization directions of modulation images output by the first spatial light modulator and modulated ambient light output by the second spatial light modulator are the same.

Preferably, in the foregoing display apparatus, the spatial light modulator further simulates glasses and compensates diopter and astigmatism of eyes of wearers with diopter and astigmatism based on signals generated by the control circuit.

Preferably, in the foregoing display apparatus, the display unit is an OLED screen, or a combination of a transmissive LCoS or LCD screen and a light guide, or a combination of an LCoS, a digital micro-mirror device (DMD) or an LCD and a light source and a combiner, or a combination of an OLED screen and a combiner.

Preferably, in the foregoing display apparatus, the combiner is a combination of a BS, a PBS or a transparent light guide and a DOE/HOE film.

Preferably, in the foregoing display apparatus, the first and/or second spatial light modulator is an LCD or an LCoS spatial light modulator that does not change the polarization direction of the incident light.

Preferably, in the foregoing display apparatus, the first and/or second spatial light modulator adopts phase modulation.

Preferably, in the foregoing display apparatus, the display apparatus is wearable glasses.

According to another aspect of the present disclosure, a method for controlling a display apparatus is provided. The display apparatus includes a control circuit, a display unit, and a spatial light modulator, the spatial light modulator is set in front of the display unit and is connected to the control circuit through signals, and the controlling method includes:

generating images by the display unit, where each frame in the image includes one or more subframes, and each subframe includes depth information thereof; and when each subframe is displayed, setting, by the spatial light modulator, modulation parameters as a corresponding image distance based on the depth information of the subframe.

Preferably, in the foregoing controlling method, modulation data on the spatial light modulator is generated in real time based on the depth information.

Preferably, in the foregoing controlling method, modulation data on the spatial light modulator is generated in advance and stored in the control circuit, and the modulation data is selected in real time based on the depth information and output to the spatial light modulator by the control circuit.

Preferably, in the foregoing controlling method, each subframe is further divided into several bicolor or multicolor color subframes, the spatial light modulator modulates images at different distances through time-division multiplexing in color, and modulation data of each color or wavelength respectively corresponds to the modulation parameters (where the modulation data correspondingly changes for a different wavelength at the same depth).

Preferably, in the foregoing controlling method, refresh rates of the display unit and the spatial light modulator are the same, the refresh rates are N*C times the frame rate of the display unit, N is the quantity of depth subframes, C is the quantity of color subframes, N and C are both natural numbers, and the quantity of subframes of each frame in the image is N*C.

Preferably, in the foregoing controlling method, each subframe is further divided into several partial subframes, the partial subframes modulate images of colors corresponding to the partial subframes to the same image distance, modulation data of the partial subframes are different, and accumulation of errors between the modulation data of the several partial subframes and ideal modulation data is less than the error between modulation data of a single frame and the ideal modulation data.

Preferably, in the foregoing controlling method, refresh rates of the display unit and the spatial light modulator are different, the refresh rate of the display unit is N*C times a frame rate of the display unit, N is the quantity of depth subframes, C is the quantity of color subframes, the refresh rate of the spatial light modulator is M*N*C times the frame rate of the display unit, M, N and C are natural numbers, the quantity of subframes of each frame in the image is N*C, and the quantity of partial subframes is M*N*C.

It should be understood that the foregoing general descriptions and the following detailed descriptions of the present disclosure are merely exemplary and illustrative, and aim at providing further explanations for the present disclosure according to the claims.

BRIEF DESCRIPTION OF THE DRAWINGS

The accompanying drawings are included to provide a further understanding of the present disclosure, and are recorded and constitute a part of this application. The accompanying drawings show embodiments of the present disclosure, and together with the specification, serve to explain the principle of the present disclosure. In the accompanying drawings:

FIG. 1b shows the display principle of the display apparatus in FIG. 1a;

DETAILED DESCRIPTION

Embodiments of the present disclosure are described in detail below with reference to the accompanying drawings. Reference is specifically made to preferred embodiments of the present disclosure, and examples of the preferred embodiments are shown in the accompanying drawings. Same numerals are used in all of the accompanying drawings to represent same or similar parts in all possible cases. In addition, although the terms used in the present disclosure are selected from generally known and used terms, some terms used in the specification of the present disclosure may be chosen by the applicant based on his or her determining, and detailed meanings of the terms are described in related parts of descriptions of the specification. In addition, it is required that the present disclosure is understood not only through the terms actually used but through the implied meanings of each term.

First, the basic principle of the present disclosure and one preferred embodiment of the present disclosure are described with reference to FIG. 1a and FIG. 1b.

Figure 1A:
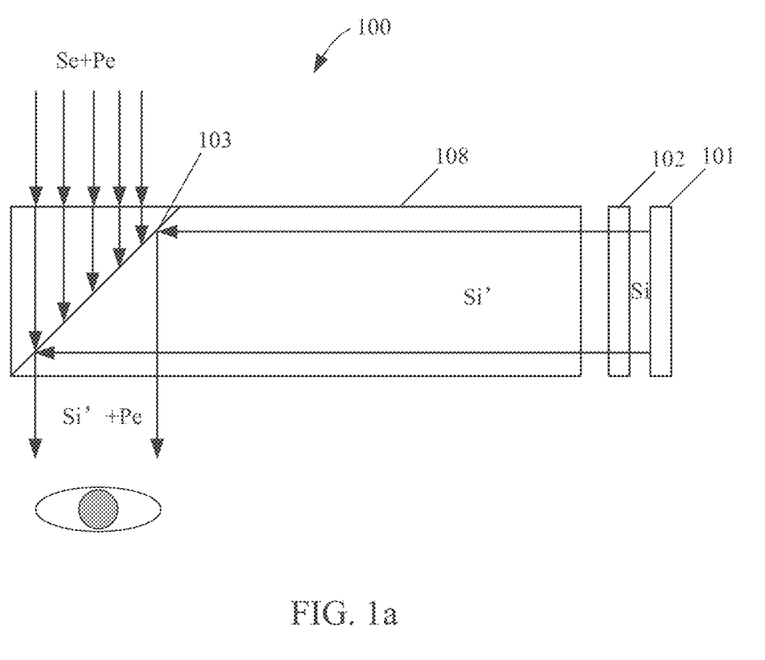
FIG. 1a is a schematic diagram of a first embodiment of a display apparatus according to the present disclosure.
Figure 1B:
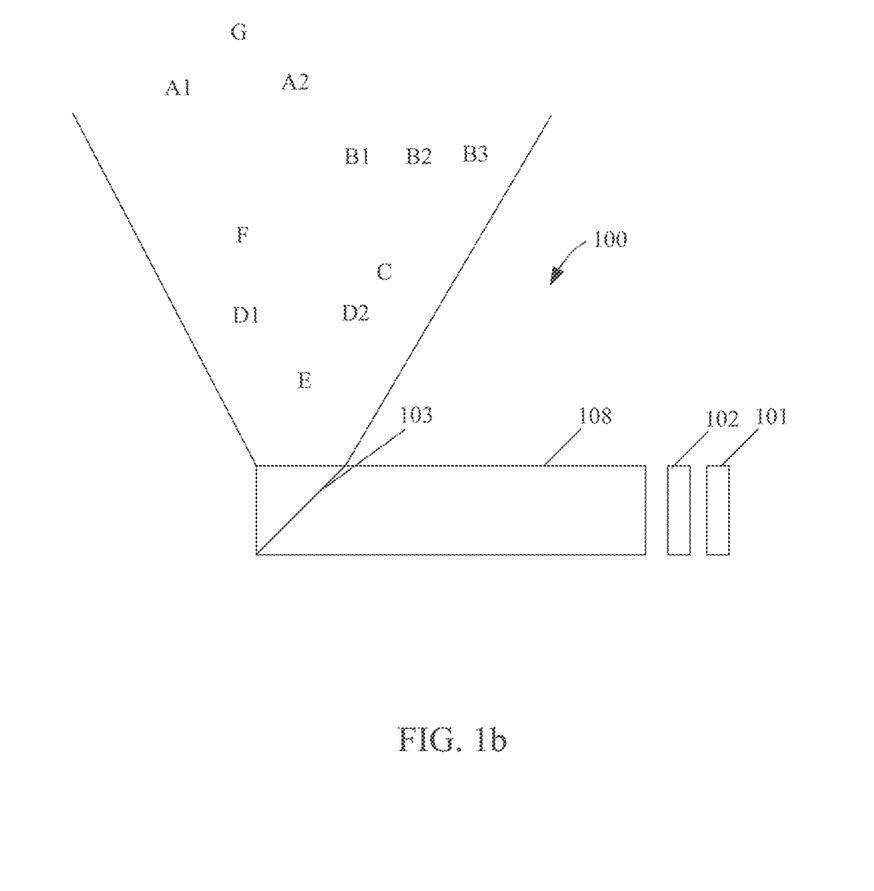

As shown in FIG. 1a and FIG. 1b, a display apparatus 100 mainly includes a control circuit (not shown), a display unit 101 and a first spatial light modulator 102. Specifically, the display apparatus 100 can be wearable glasses. In addition, the display apparatus 100 may be simultaneously applied to left and right eyes, and a parallax between the left and right eyes is formed to create stronger 3D experience. In addition, the display apparatus 100 in the present disclosure may further use a sensor to detect the focal length of the viewer, gesture, motion sensing signals, or the like, send the feedback to the control system, and synchronize the spatial light modulator to automatically adjust the imaging distances.

The display unit 101 is configured to generate images. For example, the display unit 101 may use a micro-display chip, for example, a device such as a DMD, an LCoS or an LCD chip plus a light source (LED(s), LD(s), or the like), or an OLED screen. In addition, the display unit 101 may further be a combination of a transmissive LCoS or LCD screen and a light guide, or a combination of an LCoS, a DMD or an LCD and a light source and a combiner, or a combination of an OLED screen and a combiner. The combiner may be a combination of a BS, a PBS or a transparent light guide and a HOE film.

The first spatial light modulator 102 is set in front of (that is, a front end of an optical path) the display unit 101 and is connected to the control circuit through signals. The first spatial light modulator 102 is configured to change modulation patterns or contents based on electronic signals generated by the control circuit, to dynamically adjust spatial imaging distances. In this way, the first spatial light modulator 102 can present the image at a distance away from the viewer according to the requirement.

The first spatial light modulator 102 may use a phase modulation device (for example, use a device such as a transmissive LCD or a transmissive LCoS that is in an ECB or a VA mode that does not change the polarization direction and intensity of the incident light). By changing phase distribution on the first spatial light modulator 102 (for example, the modulation ability of the first spatial light modulator 102 through phase modulation at a visible light waveband ranging from 380 to 700 nm is greater than 2π), the first spatial light modulator 102 becomes a special lens whose optical property (for example, the focal length) can be adjusted in real time through electrical signal control, so that the first spatial light modulator 102 can modulate the image of the display unit 101 to virtual images at different distances away from the viewer.

The control circuit is responsible for transmitting image signals to the display unit 101, and controlling them to be displayed, transmitting modulation signals to the first spatial light modulator 102, and synchronizing the first spatial light modulator 102 and the display unit 101.

Based on the foregoing structure, a method for controlling a display apparatus in the present disclosure may include:

transmitting image information to the display unit 101, and generating images by the display unit 101. Each frame in the image includes one or more subframes, and each subframe includes depth information thereof; and when each subframe is displayed, setting, by the first spatial light modulator 102, modulation parameters (for example, phase distribution of a corresponding wavelength, and the phase distribution may be stored in a control unit in advance and be chosen in real time based on the depth information and the wavelength, or the phase distribution may be generated by a control unit in real time) as a corresponding image distance based on the depth information of the subframe.

In the following described example, preferably, refresh rates of the display unit 101 and the first spatial light modulator 102 are the same, the refresh rates thereof are N times a frame rate of input images of the display unit 101, N is a natural number, and the quantity of subframes of each frame in the image is N. In addition, each subframe may be further divided into several bicolor or multicolor subframes, the first spatial light modulator modulates images at different distances through time-division multiplexing in color.

Preferably, in the preferred embodiment shown in FIG. 1*a* and FIG. 1*b*, the display apparatus 100 further includes a polarizing beam splitter 103 set in front of the first spatial light modulator 102. The polarizing beam splitter 103 is set in a light guide device 108, for example a waveguide. The polarizing beam splitter 103 is configured to reflect image light, transmit external ambient light, and combine these two types of light.

As shown in the figure, one end of the polarizing beam splitter 103 receives modulation images modulated by the first spatial light modulator 102, and the other end of the polarizing beam splitter 103 converts or filters ambient light into first linearly polarized light and projects the first linearly polarized light and the modulation image to a user after combining the first linearly polarized light and the modulation image; and polarization directions of the first linearly polarized light and the modulation image are perpendicular.

In addition, other optical elements (for example, a diffuser and lenses, etc.) may be added in front of or behind the first spatial light modulator 102 to change image optical parameters (for example, angle of view). Image light modulated by the spatial light modulator is linearly polarized (for example, S light), and is reflected into eyes of the viewer after being transmitted to the polarizing beam splitter 103. Ambient light of external scenery is combined with the image light into one path after passing through the polarizing beam splitter. When the viewer uses the display apparatus 100 for viewing, an effect that virtual images are superimposed on the external scenery is achieved, and distances between the virtual images and the viewer can be adjusted arbitrarily by using the spatial light modulator.

Further, referring to FIG. 1*b*, the principle of the present disclosure is further discussed.

The control circuit may use persistence of vision of eyes to quickly synchronize the display unit 101 and the first spatial light modulator 102, so that the viewer sees virtual images at different depths in the same image. For example, FIG. 1*b* includes virtual objects A1, A2, B1, B2, B3, C, D1, D2, E, F, G, A1 and A2 are at the same depth, B1, B2, and B3 are at the same depth, D1 and D2 are at the same depth, and A, B, C, D, E, F and G are at different depths.

In an implementation, the refresh rate of the display unit 101 in the display apparatus 100 is 360 Hz, the refresh rate of the spatial light modulator is also 360 Hz, the frame rate of an input video is 60 Hz, each frame of image that is input includes six subframes, and each subframe of each frame of image includes independent depth information. When displaying subframe 1, the display unit displays the objects A1 and A2, and the control circuit synchronously sets the modulation parameters on the first spatial light modulator 102 to be the image distance A, so that the viewer sees the objects A1 and A2 at a depth of A in this time period, when the second subframe B is displayed, the display unit 101 displays the objects B1, B2, and B3, and the first spatial light modulator 102 sets the modulation parameters to be the image distance B, and when the third subframe is displayed, the display unit 101 displays the object C, and the first spatial light modulator 102 sets the modulation parameters to be the image distance C. By analogy, during 1/60 s for displaying a frame of image, the viewer can see images at six different distances in total, and due to the persistence of vision of eyes, the viewer considers that a plurality of images at different distances are seen in the same frame of image.

In another implementation, because most spatial light modulators are related to the wavelength, each distance subframe may be further divided into bicolor or multicolor color subframes. Because each color has different wavelengths, the spatial light modulator modulates different color subframes in a specific time period by respectively using, based on different colors, parameters corresponding to different wavelengths, to display images at different distance through time-division multiplexing in color. For example, in FIG. 1*b*, the refresh rate of the display unit 101 is 1080 Hz, the refresh rate of the first spatial light modulator 102 is 1080 Hz, the frame rate of the input video signal is 60 Hz, each frame of image may include six distance subframes of different distance information, and each distance subframe may be further divided into color subframes in three-primary colors, namely, red, green, and blue. When the object B1 is displayed in red, B2 green, and B3 blue, a corresponding distance subframe is set to be the distance B. When a corresponding color subframe is displayed, the control circuit respectively controls the first spatial light modulator 102 to synchronously display modulation information (for example, phase distribution) of the distance B corresponding to wavelengths (for example, 450 nm, 520 nm, and 650 nm) of red, green, and blue. When the object C whose color includes gray level (red 14, green 91, and blue 255) is displayed, the display unit 101 displays color gray level of the image C as red 14 corresponding to a red subframe, as green 91 corresponding to a green subframe, and as blue 255 corresponding to a blue subframe. The control circuit respectively controls the first spatial light modulator 102 to synchronously display modulation information of the distance C corresponding to the wavelengths of red, green, and blue.

Similarly, displaying color images at different distances may be realized by first dividing each frame in image frames into color subframes, and then dividing the same color subframe into distance subframes.

In addition, in reality, the spatial light modulator often has deviations due to hardware (and therefore fails to create a modulation effect as that of an ideal lens). Each subframe may be further divided into several partial subframes, and partial subframes of each subframe modulate images of corresponding subframes or color subframes to the same depth. However, modulation data of the partial subframes is different, and variations between modulation data of each partial subframes and ideal modulation data are different. Because of the persistence of vision, a final image seen by eyes is integration (accumulation) relative to time of the partial subframes quickly iterated. By setting data of each partial subframe, variations generated by the partial subframes relative to ideal modulation can compensate each other, so that the total variation between the partial subframes and the ideal modulation is less than a variation between a single subframe and the ideal modulation, thereby improving imaging quality. For example, in the foregoing example, the refresh rate of the display unit 101 is 1080 Hz, the refresh rate of the first spatial light modulator 102 is 3240 Hz, each subframe is further divided into three partial subframes, each partial subframe modulates images of the same wavelength to the same imaging distance, but modulation data is different, variations compensate each other, and the accumulated variation generated by the three partial subframes relative to time is less than the variation of using the single subframe, thereby improving the imaging quality.

Figure 1C:
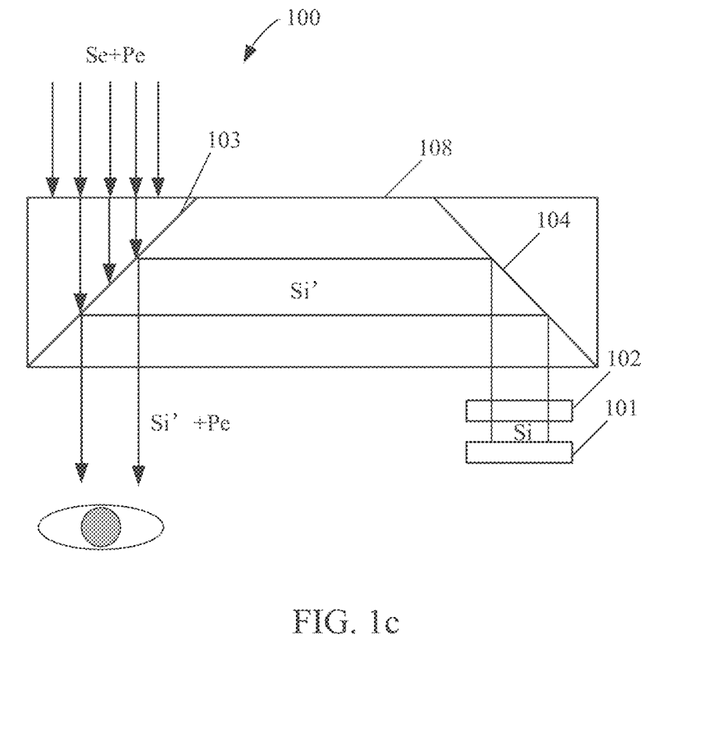
FIG. 1c and FIG. 1d show two variant embodiments of the first embodiment of the present disclosure.
Figure 1D:
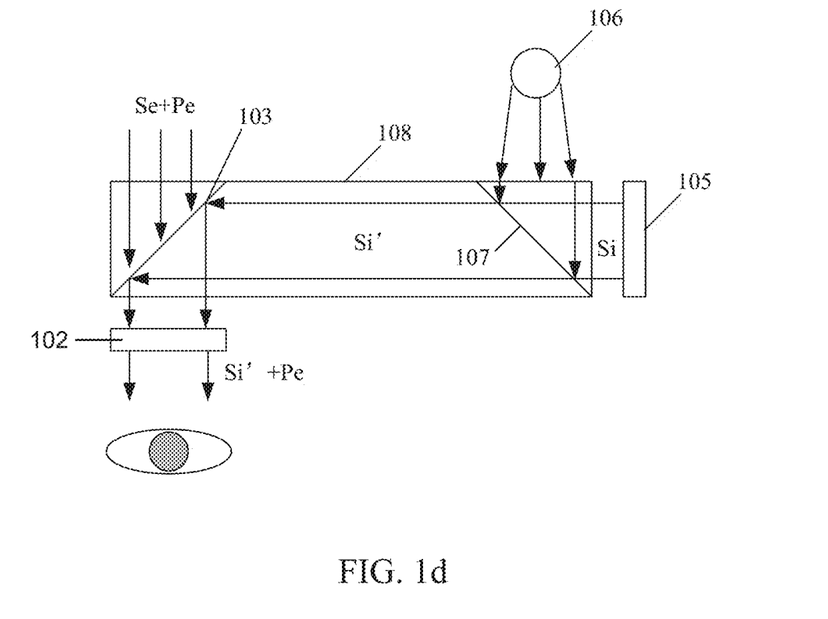

FIG. 1c and FIG. 1d show two variant embodiments of the foregoing first embodiment. In the variant embodiment shown in FIG. 1c, a reflector 104 may be used to set the display unit 101 to be on the same side of the viewer. In the variant embodiment shown in FIG. 1d, the same device 105 (for example, an LCD screen, an LCoS or a DMD) may be used to form the forgoing display unit 101. In this embodiment, an illumination apparatus 106 is added between the polarizing beam splitter 103 and the device 105 (when the device 105 is a DMD, the polarization direction of light emitted from the illumination apparatus 106 is perpendicular to the polarization direction of external light passing through the polarizing beam splitter 103, and a prism 107 between the device 105 and the illumination apparatus 106 may be total internal reflection (TIR) apparatus, and the prism 107 reflects the light emitted from the 106 to the DMD). Images are generated by the DMD, and image light enters the light guide device 108 through the prism 107 after being reflected, so that the image light is reflected by the polarizing beam splitter 103 and is combined with external ambient light into one path. When the device 105 is an LCoS, the polarization direction of the light emitted from the illumination apparatus 106 is the same as the polarization direction of the external light passing through the polarizing beam splitter 103, the prism 107 between the device 105 and the illumination apparatus 106 is a polarizing beam splitter PBS, the prism 107 reflects the light to the LCoS 105, and the LCoS generates images and reflects image light, and rotates the polarization direction of the image light by 90°, so that the image light can enter the light guide device 108 through the prism 107, thereby being reflected by the polarizing beam splitter 103 and combining with the external ambient light into one path).

In the foregoing variant embodiments, the spatial light modulator may also be combined with the display unit into the same device, an image is formed through interference and diffraction and modulation information is added (for example, phase modulation is added into the image), so that the distance of the image seen by the viewer is modulated while the image is formed.

Figure 2:
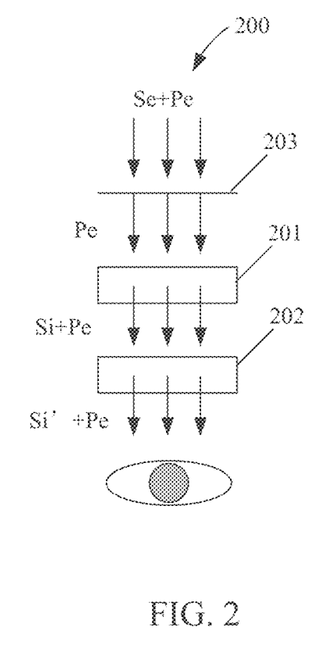
FIG. 2 is a schematic diagram of a second embodiment of a display apparatus according to the present disclosure.

FIG. 2 is a schematic diagram of a second embodiment of a display apparatus according to the present disclosure. In this embodiment, a display apparatus 200 mainly includes a control circuit (not shown), a display unit 201 and a first spatial light modulator 202, and a polarizer 203. Principles of the display unit 201 and the first spatial light modulator 202 in this embodiment are basically the same as those of the display unit 101 and the first spatial light modulator 102 in the first embodiment discussed above. Therefore, details are not described again.

A main difference between the first embodiment and the second embodiment lies in the polarizer 203 set behind (that is, set at the rear end of an optical path) the display unit 201, to convert or filter ambient light into first linearly polarized light (for example, light Pe). In addition, in the second embodiment, the display unit 201 and the first spatial light modulator 202 are transparent units. For example, the display unit 201 may use a transparent OLED, and the first spatial light modulator 202 may use an LCD lens or a transmissive LCoS with ECB mode (where liquid crystal molecules are not twisted, and the polarization direction of incident light is not changed).

The polarizer 203 is set so that polarized light in a specific direction can be filtered out. For example, the ambient light includes components Pe and Se in a direction P and a direction S whose polarization directions are perpendicular to each other. After passing through the polarizer 203, the Se part of the ambient light is filtered out, and only the Pe part can pass through. Image light generated by the transparent display unit 201 is polarized light Si in the direction S. Light transmitted to the first spatial light modulator 202 through the display unit 201 includes the ambient light Pe and the image light Si generated by the display unit 201, that is, polarization directions of the first linearly polarized light and modulation images are perpendicular, and the both are projected to a user after being combined. In this embodiment, the used first spatial light modulator 202 can modulate only light in the direction S, and modulates the image light to Si', and does not generate phase modulation on the ambient light in the direction P, that is, that light P passes through the first spatial light modulator 202 is equivalent to only that the light P passes through a piece of even transparent medium of uniform thickness (which does not generate the impact similar to that of a lens), and the final effect seen by the viewer behind the first spatial light modulator 202 is similar to external scenery that is seen behind a piece of transparent even glass and a virtual image whose distance can be changed in real time.

Figure 3:
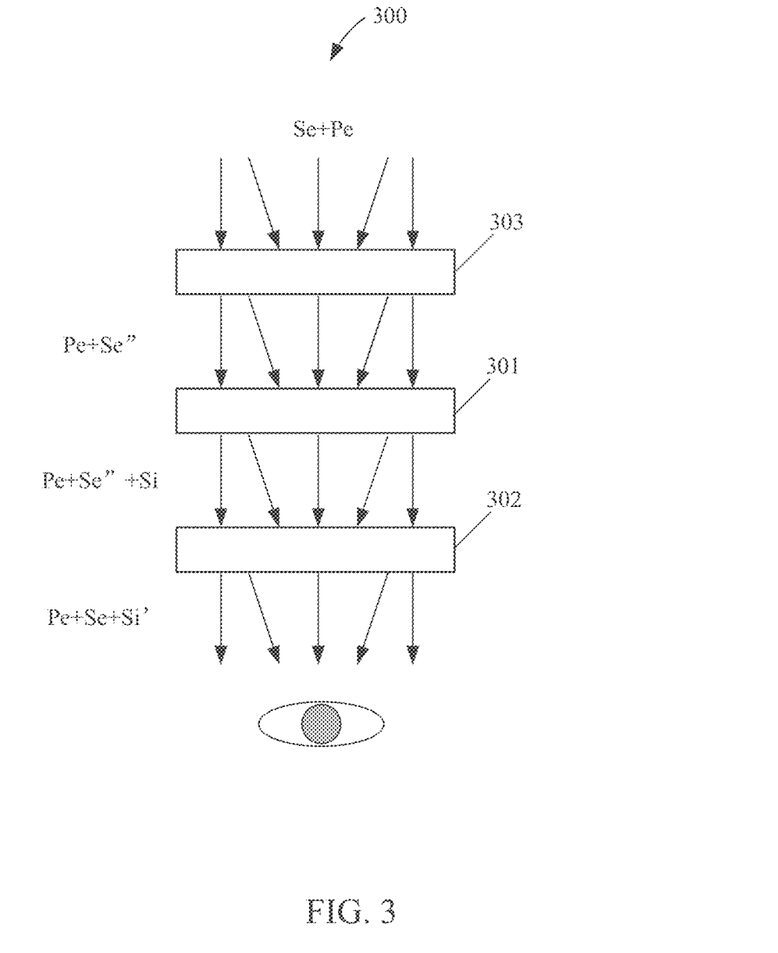
FIG. 3 is a schematic diagram of a third embodiment of a display apparatus according to the present disclosure.

FIG. 3 is a schematic diagram of a third embodiment of a display apparatus according to the present disclosure. In this embodiment, a display apparatus 300 mainly includes a control circuit (not shown), a display unit 301 and a first spatial light modulator 302, and a second spatial light modulator 303. The principle of the display unit 301 and/or the first spatial light modulator 302 in this embodiment is basically the same as principles of the display unit 101 and the first spatial light modulator 102 in the first embodiment discussed above. Therefore, details are not described again.

A main difference between the first embodiment and the third embodiment lies in the second spatial light modulator 303 set behind (that is, set at a rear end of an optical path) of the display unit. In addition, in the third embodiment, the display unit 301 and the first spatial light modulator 302 are transparent display units. For example, the display unit 301 may use a transparent OLED, and the first spatial light modulator 302 may use an LCD lens or a transmissive LCoS with the ECB mode (where liquid crystal molecules are not twisted, and a polarization direction of incident light is not changed).

Particularly, the second spatial light modulator 303 compensates ambient light, to compensate changes (for example, light-field changes) generated when the ambient light passes through the first spatial light modulator 302 and the display unit 301, so that light-field changes generated, after the ambient light passes through the display apparatus 300, in two perpendicular polarization directions are the same (that is, light fields generated after the ambient light passes through the second spatial light modulator 303, the display unit 301 and the first spatial light modulator 302 in the display apparatus 300 and generated when the ambient light is transmitted in free space are the same); or the change of ambient light in the polarization direction S that is modulated by the spatial light modulator is the same as the change of ambient light in the polarization direction P that is not modulated by the spatial light modulator. Finally, a final effect seen by the viewer behind the first spatial light modulator 302 is similar to external scenery that is directly seen (or external scenery seen through a piece of plain transparent glasses) and a virtual image whose distance can be changed in real time, and this method has little impact on brightness of the ambient light, and does not generate an effect similar to a sunglasses effect of a polarizer.

In addition, in this embodiment, polarization directions of the modulation images output by the first spatial light modulator 302 and modulated ambient light output by the second spatial light modulator 303 are the same. For example, the second spatial light modulator 303 and the first spatial light modulator 302 both modulate only polarized light in the direction S. Image light generated by the display unit 301 is Si in the polarization direction S, and Si' is generated after Si is modulated by the first spatial light modulator 302. The viewer sees a virtual image whose distance can be changed in real time. Ambient light Pe in the direction P transmits the spatial light modulator without being modulated by the spatial light modulator, while ambient light Se in the direction S is first modulated to Se" by the spatial light modulator 2, and then modulated by the first spatial light modulator 302, and the ambient light Se" in the direction S is restored to Se having the same phase with the light Pe. Finally, a final effect seen by the viewer behind the first spatial light modulator 302 is similar to external scenery that is seen behind a piece of transparent even glass and a virtual image whose distance can be changed in real time.

In addition, preferably, a polarizer may be set between the display unit 301 and the second spatial light modulator 303, to convert or filter the ambient light into linearly polarized light.

Alternatively, in another preferred embodiment, the first and/or second spatial light modulator may further simulate glasses, compensate diopter and astigmatism, and so on based on diopter signals generated by the control circuit, to facilitate wearing of a myopic viewer.

Figure 4:
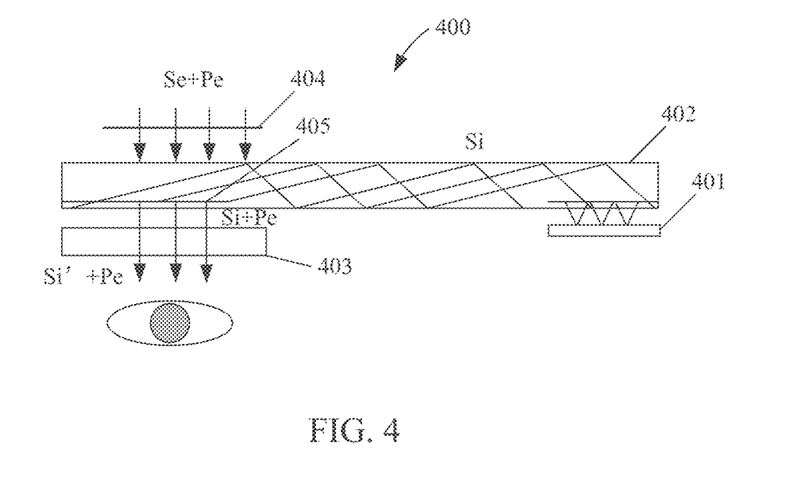
FIG. 4 is a schematic diagram of a fourth embodiment of a display apparatus according to the present disclosure.

Referring to FIG. 4, FIG. 4 is a schematic diagram of a fourth embodiment. In the fourth embodiment, polarized image light Si in the direction S that is generated by a display unit 401 is guided into a waveguide medium 402, Si is transmitted after several times of total internal reflection in the waveguide medium 402, and is injected at another side of the waveguide medium 402 to a HOE film 405 (optical gratings) before exiting. The solution in which the HOE film 405 is combined with the waveguide medium 402 can realize a relatively large field of view and eyebox, and convert images exited from the waveguide medium 402 and the HOE film 405 to a virtual image at a distance (for example, infinitely far) away from the viewer. A spatial light modulator 403 modulates the image light Si exiting from 405, and modulates Si in real time to the virtual image at a required distance away from the viewer. External ambient light first passes through a polarizer 404, only polarized light Pe in the direction P passes through the polarizer 404, and that the ambient light passes through the waveguide medium 402 and the HOE film 405 is similar to that the ambient light passes through a piece of even transparent medium of uniform thickness.

In the present disclosure, the modulation parameter/information on the spatial light modulator (for example, phase distribution) may be externally generated in advance (for example, generated by using an external computer in advance) and stored in the control unit, and the modulation parameter/information is selected for display in real time by the control unit based on depth information of an image and the corresponding wavelength; or a modulation parameter/information is generated in real time and displayed by the control unit based on depth information of an image and the corresponding wavelength.

In addition, in the foregoing embodiments, the polarizer or the second spatial light modulator may be replaced with a lightproof material to prevent the ambient light from entering, thereby changing the display apparatus to a virtual reality (VR) display device in which the imaging distances can be changed in real time.

It is apparent for a person skilled in the art that various modifications and variations can be made to the examples of the embodiments of the present disclosure without departing from the spirit and scope of the present disclosure. Therefore, the modifications and variations of the present disclosure shall fall within the scope of the appended claims and equivalent technical solutions thereof of the present disclosure.

What is claimed is:

1. A display apparatus, comprising:
    a control circuit;
    a display unit, configured to generate images; and
    a first spatial light modulator, set in front of the display unit and connected to the control circuit, wherein the first spatial light modulator is configured to change modulation pattern or content based on electronic signals generated by the control circuit, to dynamically adjust spatial imaging distances,
    wherein the display apparatus further comprises a second spatial light modulator set behind the display unit, and
    a polarizer set between the display unit and the second spatial light modulator, to convert or filter ambient light into linearly polarized light;
    wherein the display unit and the first spatial light modulator are transparent; and
    the second spatial light modulator compensates the ambient light to compensate changes generated when the ambient light passes through the first spatial light modulator and the display unit, so that light-field changes generated, after the ambient light passes through the display apparatus, in two perpendicular polarization directions are the same.

2. The display apparatus according to claim 1, wherein polarization directions of modulation images output by the first spatial light modulator and modulated ambient light output by the second spatial light modulator are the same.

3. The display apparatus according to claim 1, wherein the first and/or second spatial light modulator further simulates glasses and compensates diopter and astigmatism based on signals generated by the control circuit.

4. The display apparatus according to claim 1, wherein the display unit is an organic light emitting diode (OLED) screen, or a combination of a transmissive liquid crystal on silicon (LCoS) or liquid crystal display (LCD) screen and a light guide, or a combination of an LCoS, a digital micro-mirror device (DMD) or an LCD and a light source and a combiner, or a combination of an OLED screen and a combiner.

5. The display apparatus according to claim 4, wherein the display unit further comprises a combiner, and the combiner is a combination of a beam splitter (BS), a polarizing beam splitter (PBS) or a transparent light guide and a holographic optical element (HOE) film.

6. The display apparatus according to claim 1, wherein the display apparatus is wearable glasses.

7. The display apparatus according to claim 1, wherein the first and/or second spatial light modulator is a liquid crystal or a liquid crystal on silicon spatial light modulator that does not change the polarization direction of an incident light.

8. The display apparatus according to claim 1, wherein the first and/or second spatial light modulator operates by changing phase distribution.

* * * * *